United States Patent
Chou

(10) Patent No.: US 6,674,317 B1
(45) Date of Patent: Jan. 6, 2004

(54) OUTPUT STAGE OF A CHARGE PUMP CIRCUIT PROVIDING RELATIVELY STABLE OUTPUT VOLTAGE WITHOUT VOLTAGE DEGRADATION

(75) Inventor: Shao Yu Chou, Tao-yuan (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 10/246,275

(22) Filed: Sep. 18, 2002

(51) Int. Cl.$^7$ .................................................. G06F 7/64
(52) U.S. Cl. ........................................................ 327/536
(58) Field of Search ................................. 327/530, 534, 327/535, 536, 537

(56) References Cited

U.S. PATENT DOCUMENTS

| | | | |
|---|---|---|---|
| 4,922,402 A | 5/1990 | Olivo et al. .................. 363/60 |
| 5,140,182 A | * 8/1992 | Ichimura ..................... 327/536 |
| 5,489,870 A | 2/1996 | Arakawa ..................... 327/536 |
| 5,581,454 A | 12/1996 | Collins ........................ 363/59 |
| 5,625,544 A | 4/1997 | Kowshik et al. ............. 363/59 |
| 5,635,776 A | 6/1997 | Imi ............................. 307/110 |
| 5,721,509 A | 2/1998 | Taft et al. .................... 327/536 |
| 5,754,476 A | 5/1998 | Caser et al. .............. 365/185.29 |
| 5,760,637 A | 6/1998 | Wong et al. ................. 327/536 |
| 5,815,026 A | 9/1998 | Santin et al. ................ 327/536 |
| 5,877,635 A | 3/1999 | Lin .............................. 326/83 |
| 5,877,948 A | 3/1999 | Dijkmans .................... 363/60 |
| 5,907,484 A | 5/1999 | Kowshik et al. ............. 363/60 |
| 6,023,188 A | 2/2000 | Lee et al. .................... 327/536 |
| 6,064,251 A | 5/2000 | Park ........................... 327/536 |
| 6,130,572 A | 10/2000 | Ghilardelli et al. ......... 327/536 |
| 6,151,229 A | 11/2000 | Taub et al. ................... 363/60 |
| 6,373,324 B2 | * 4/2002 | Li et al. ...................... 327/536 |

* cited by examiner

*Primary Examiner*—Jeffrey Zweizig
(74) *Attorney, Agent, or Firm*—George O. Saile; Stephen B. Ackerman; Larry J. Prescott

(57) ABSTRACT

An output stage and method for a charge pump circuit which substantially reduces the degradation of the output voltage. A first NMOS transistor has its source connected to an input node and its drain connected to a second node. A second NMOS transistor has its source connected to the input node, its gate connected to the drain of the first NMOS transistor, and its drain connected to the gate of the first NMOS transistor. A capacitor is connected between a second clock signal and the drain of the second NMOS transistor. Another capacitor is connected between a first clock signal and an intermediate node. The key part of the invention is a diode pair connected anode of one to the cathode of the other and inserted between the intermediate node and the drain of the first NMOS transistor. This has the effect of changing a parallel combination of capacitors to a series combination of capacitors, thereby reducing the degradation of the output voltage and providing a stable voltage to the gate of an NMOS transistor switch in the output of the circuit.

31 Claims, 5 Drawing Sheets

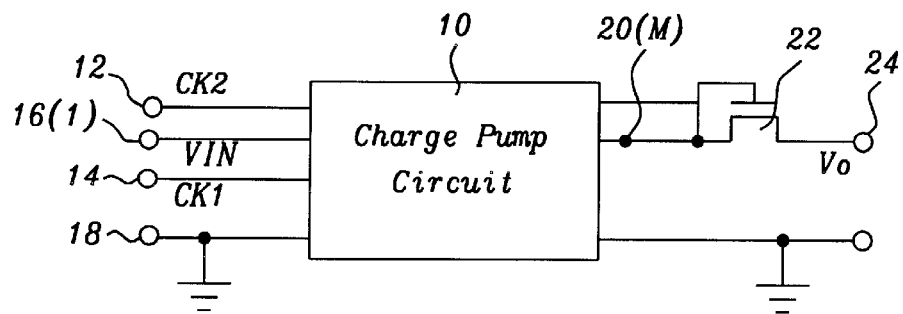
FIG. 1 - Prior Art
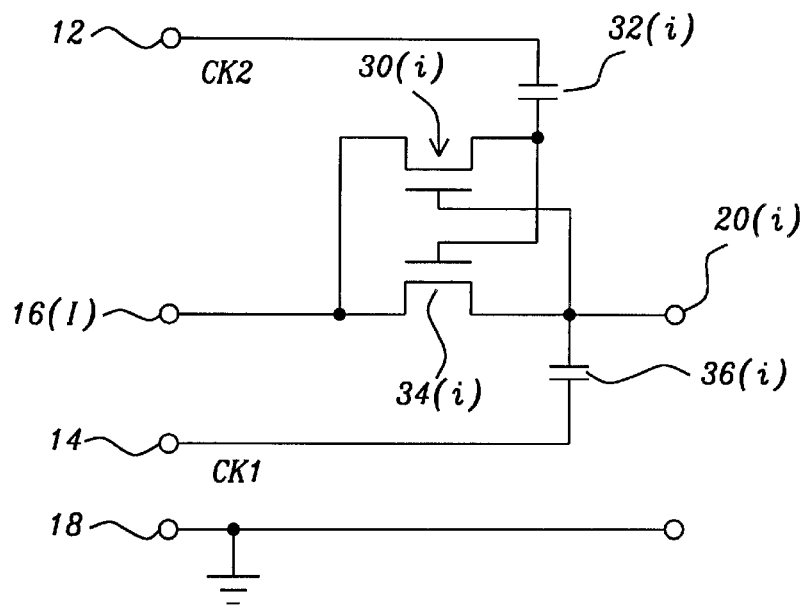
FIG. 2 - Prior Art

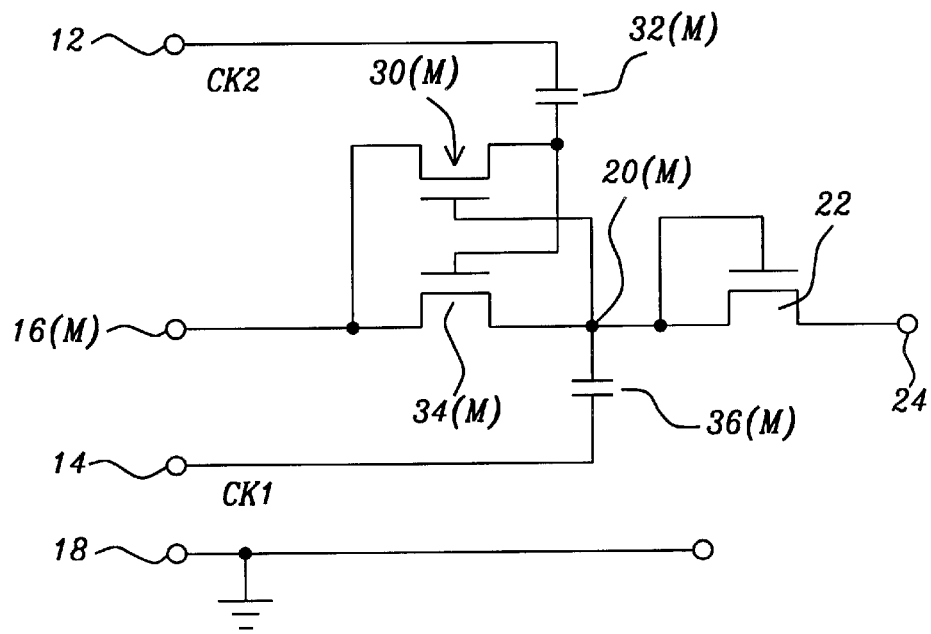
FIG. 3 – Prior Art
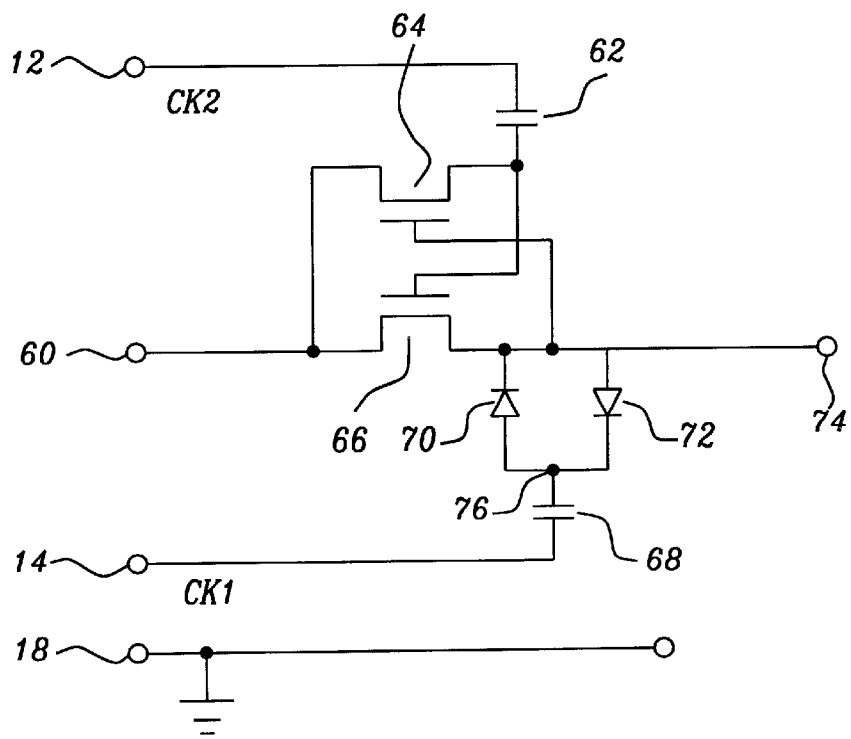
FIG. 4

OUTPUT STAGE OF A CHARGE PUMP CIRCUIT PROVIDING RELATIVELY STABLE OUTPUT VOLTAGE WITHOUT VOLTAGE DEGRADATION

BACKGROUND OF THE INVENTION

1. Field of the Invention

This invention relates to charge pump circuits and more specifically to the output stage of a charge pump circuit which provides a stable output voltage.

2. Description of the Related Art

Charge pump circuits are often used in semiconductor circuit applications when higher voltages are required and it is desirable to avoid additional power supplies. Charge pump circuits can be used to produce higher voltages for these applications often on the same integrated circuit chip.

U.S. Pat. No. 5,625,544 to Kowshik et al. and U.S. Pat. No. 5,907,484 to Kowshik et al. describe a charge pump circuit using N stages of diode-capacitor voltage multipliers clocked to convert a low voltage to a higher voltage.

U.S. Pat. No. 5,754,476 to Caser et al. describes a negative charge pump circuit having a plurality of charge pump stages.

U.S. Pat. No. 5,877,948 to Dijkmans describes a voltage converter provided with charge pumps in which conventional rectifier diodes are replaced by output transistors.

U.S. Pat. No. 6,130,572 to Ghilardelli et al. describes a negative charge pump circuit comprising a plurality of charge pump stages connected in series.

U.S. Pat. No. 5,815,026 to Santin et al. describes an integrated circuit voltage multiplier.

U.S. Pat. No. 4,922,402 to Olivo et al. describes an integrated, multistage, CMOS voltage multiplier.

U.S. Pat. No. 5,721,509 to Taft et al. describes a charge pump having reduced threshold voltage losses.

U.S. Pat. No. 6,151,229 to Taub et al. describes a reconfigurable charge pump.

U.S. Pat. No. 6,064,251 to Park describes a low voltage charge pump system with a large output voltage range.

U.S. Pat. No. 5,635,776 to Imi describes a charge pump circuit which has a simple circuit configuration yet can boost the power source 4 or 8 times.

U.S. Pat. No. 5,489,870 to Arakawa describes a voltage booster circuit which can cancel the back bias effect, can prevent the increase of the surface area of the circuit and the power consumption, prevent the complication of the clock generation circuit, and prevent lowering of the current capability.

U.S. Pat. No. 6,023,188 to Lee et al. describes a two-phase charge pump system utilizing NMOS and/or PMOS transistors.

U.S. Pat. No. 5,877,635 to Lin describes a charge-pump circuit using a single NMOS transistor, a diode, and two capacitive means driven by a clock circuit.

U.S. Pat. No. 5,581,454 to Collins describes a DC-to-DC step-up or step-down voltage converter.

U.S. Pat. No. 5,760,637 to Wong et al. teaches a programmable charge pump producing one of a plurality of bipolar output voltages utilizing logic circuitry.

SUMMARY OF THE INVENTION

An NMOS, N channel metal oxide semiconductor field effect transistor, switch is frequently used to pass the high voltage signal from the charge pump because it is easier to control than a PMOS, P channel metal oxide semiconductor field effect transistor, switch. However, a higher voltage with better voltage regulation is required to control the gate of an NMOS switch compared to the voltage required to control the gate of a PMOS switch.

It is a principle objective of this invention to provide an output stage for a charge pump circuit which provides an increased voltage and improved voltage regulation to the gate of an NMOS switch.

It is another principle objective of this invention to provide a voltage multiplier circuit having a charge pump circuit and an output stage which provides an increased voltage and improved voltage regulation to the gate of an NMOS switch.

These objectives are achieved by inserting a diode pair between the drain of a first NMOS transistor and a first capacitor. A first NMOS transistor has its source connected to an input node and its drain connected to a second node. A second NMOS transistor has its source connected to the input node, its gate connected to the drain of the first NMOS transistor, and its drain connected to the gate of the first NMOS transistor. A second capacitor is connected between a node supplying a second clock signal and the drain of the second NMOS transistor. A second capacitor is connected between a node supplying a first clock signal and an intermediate node. A diode pair connected anode of one to the cathode of the other is inserted between the intermediate node and the drain of the first NMOS transistor. This has the effect of changing a parallel combination of capacitors to a series combination of capacitors, thereby reducing the capacitance seen by the drain of the first NMOS transistor and reducing the degradation of the output voltage.

BRIEF DESCRIPTION OF THE DRAWINGS

FIG. 1 shows a block diagram of a multistage charge pump circuit whit an output connected to an NMOS switch.

FIG. 2 shows a schematic diagram of a conventional charge pump stage.

FIG. 3 shows a schematic diagram of the conventional charge pump stage connected to an NMOS switch.

FIG. 4 shows a schematic diagram of the output stage of this invention for a charge pump circuit.

DESCRIPTION OF THE PREFERRED EMBODIMENTS

Figure 5:
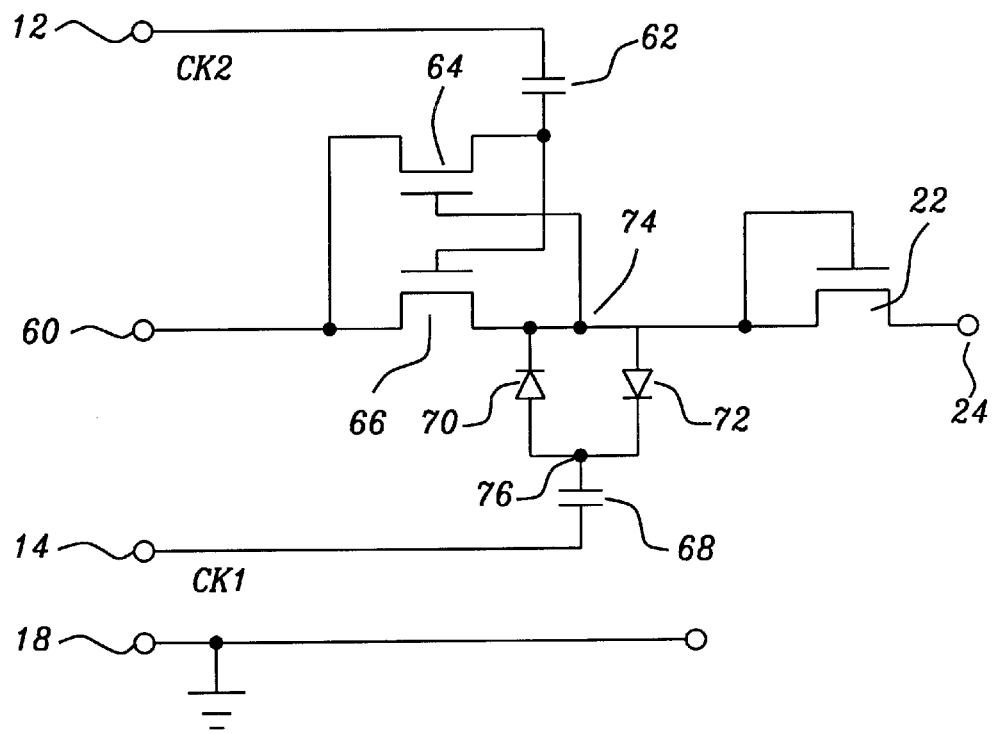
FIG. 5 shows a schematic diagram of the output stage of this invention connected to an NMOS switch.

Refer now to FIGS. 1–8 for a description of the preferred embodiments of this invention. FIG. 1 shows a block diagram of a conventional multistage charge pump circuit 10 having M stages, where M is a positive integer, and a plurality of phases feeding an NMOS, N channel metal oxide semiconductor field effect transistor, switch 22. Typically the number of phases used is four, however more or fewer phases can be used, and the number of stages, M, is four, however more or fewer stages can be used. An input voltage, $V_{IN}$, is applied to an input terminal 16(1). The NMOS switch 22 is inserted between the output node 20(M) of the charge pump circuit 10 and the voltage output node 24. A first clock signal, CK1, is supplied to a first clock node 14 and a second clock signal, CK2, is supplied to a second clock node 12. All voltages are referenced to ground potential and a ground node 18 is shown to indicate this.

Figures 6, 7:
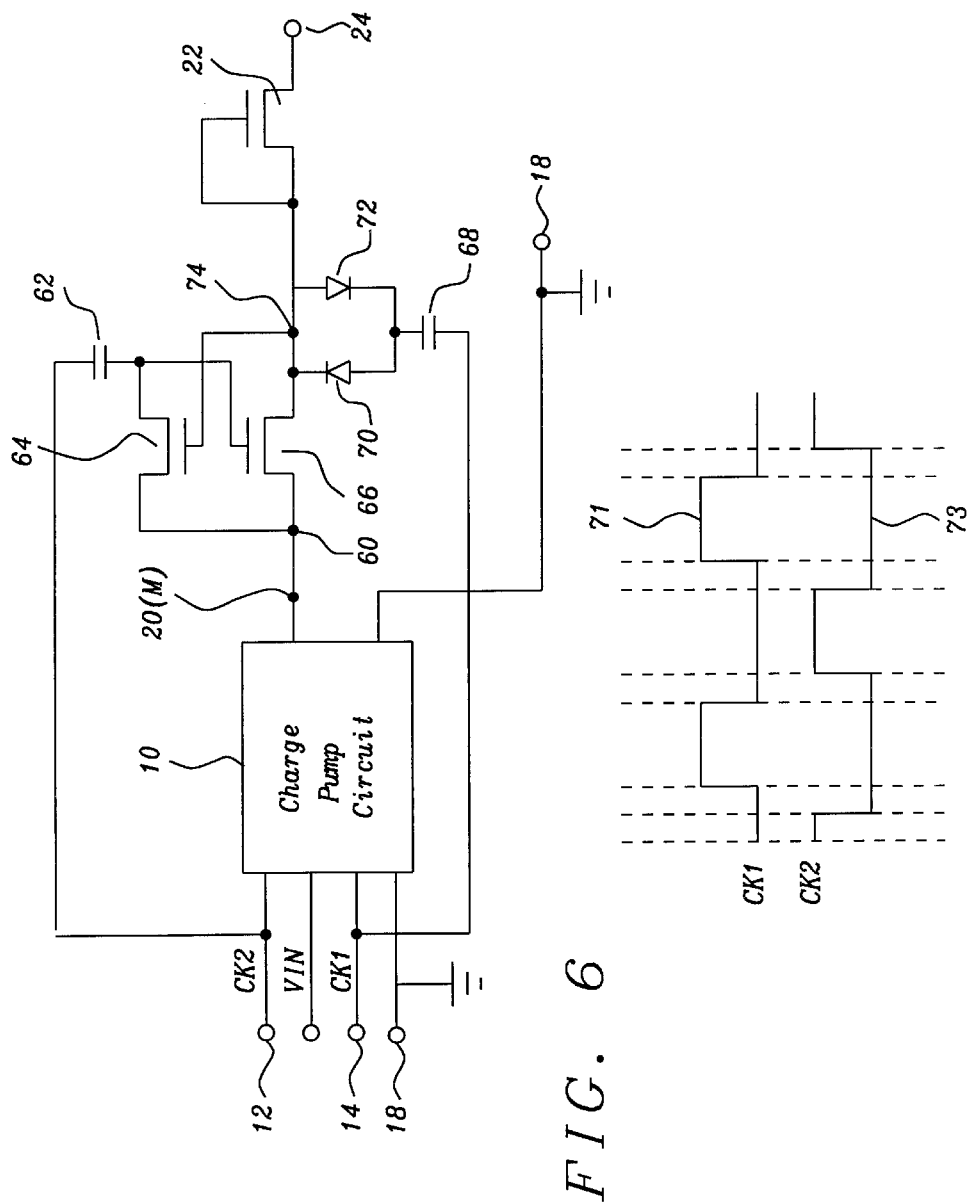
FIG. 6 shows the output stage of this invention inserted between the multistage charge pump circuit and the NMOS switch.
FIG. 7 shows the timing of the first clock signal and the second clock signal.

The timing of the first clock signal and the second clock signal is shown in FIG. 7. As shown in FIG. 7, the voltage of the second clock signal 73 is low when the voltage of the first clock 71 signal is high, and the voltage of the first clock signal 71 is low when the voltage of the second clock signal 73 is high.

FIG. 2 shows one stage of the conventional charge pump circuit. The charge pump stage has an input node 16(i), an output node 20(i), a first NMOS transistor 34(i), a first capacitor 36(i), a second NMOS transistor 30(i), and a second capacitor 32(i) connected as shown in FIG. 2. The index (i) in the charge pump stage is to indicate the stage of the charge pump circuit from 1 to M. The stages of the charge pump circuit are as identical as the device tolerances of the devices used permit. The first clock signal is supplied to a first clock node 12, and the second clock signal is supplied to a second clock node. As is normal convention all voltages are referenced to ground potential and a ground node 18 is shown to indicate this.

FIG. 3 shows the final stage, indicated by the index (M), of the charge pump circuit connected to an NMOS switch 22. The input node 16(M) of the final stage is connected to the output node 20(M−1) of the previous stage, not shown in FIG. 3. The first clock signal is supplied to the first clock node 14 and the second clock signal is supplied to the second clock node 12. The voltage at the final stage output node 20(M) is supplied to the source and gate of the NMOS switch 22. The drain of the NMOS switch 22 is connected to a second output node 24. The second NMOS transistor 30(M) and the second capacitor 32(M) of the final stage are connected as shown in FIG. 3.

The voltage at the final stage output node 20(M) is degraded by the capacitance seen by the of final stage output node 20(M), as the parallel combination of the gate capacitance of the final stage second NMOS transistor 30(M) and capacitance of the final stage first capacitor 36(M), which is the sum of the gate capacitance of the final stage second NMOS transistor 30(M) and capacitance of the final stage first capacitor 36(M). The larger the capacitance seen by the final stage output node 20(M) the greater the degradation of the voltage at the final stage output node 20(M).

The output stage of this invention is shown in FIG. 4. This output stage will be inserted between the M stage charge pump circuit and the NMOS switch. As shown in FIG. 4, This output stage is similar to the pumping stages of the charge pump circuit with a diode pair, 70 and 72, inserted between the drain of a first NMOS transistor 66 and a first capacitor 68. The output stage has an input node 60, a second node 74, a first NMOS transistor 64, a first capacitor 62, a second NMOS transistor 66, and a second capacitor 68 as shown in FIG. 4. The first clock signal is supplied to a first clock node 14, and the second clock signal is supplied to a second clock node 12. As is normal convention all voltages are referenced to ground potential and a ground node 18 is shown to indicate this.

As shown in FIG. 4, the source of the first NMOS transistor 66 is connected to the input node 60, the source of the second NMOS transistor 64 is connected to the input node 60, and the drain of the first NMOS transistor 66 is connected to the second node 74. The drain of the first NMOS transistor 66 is connected to the gate of the second NMOS transistor 64 and the drain of the second NMOS transistor 64 is connected to the gate of the first NMOS transistor 66. A second capacitor 62 is connected between the first clock node 12 and the drain of the second NMOS transistor 64.

The cathode of a first diode 70 and the anode of a second diode 72 are connected to the second node 74. The anode of the first diode 70 and the cathode of the second diode 72 are connected to a third node 76. A first capacitor is connected between the third node 76 and the first clock node 14. The first clock signal is supplied to the first clock node 14, and the second clock signal is supplied to the second clock node 12. As is normal convention all voltages are referenced to ground potential and a ground node 18 is shown to indicate this.

The key part of the output stage of this invention, shown in FIG. 4, is the diode pair, 70 and 72, inserted between the second node 74 and the first capacitor 68. This diode pair, 70 and 72, connected in this manner results in the capacitance seen by the second node 74 as being equal to the series combination of the gate capacitance of the output stage second NMOS transistor 64 and capacitance of the output stage first capacitor 68, which is substantially less than the sum of the gate capacitance of the output stage second NMOS transistor 64 and capacitance of the output stage first capacitor 68. The capacitance of the output stage first capacitor 68 is typically between about 0.6 and 0.8 picofarads. The capacitance of the output stage second capacitor 62 is typically between about 0.06 and 0.08 picofarads.

Since the second NMOS transistor 64 of the output stage of this invention is the same as the second NMOS transistor 30(M) of the of the final stage of the pumping circuit shown in FIG. 3, within device tolerances, the gate capacitance of the second NMOS transistor 64 of the output stage of this invention is the same as the gate capacitance of the second NMOS transistor 30(M) of the of the final stage of the pumping circuit, also shown in FIG. 3. Further, since the capacitance of the first capacitor 68 of the output stage of this invention is the same as the capacitance of the first capacitor 36(M) of the of the final stage of the pumping circuit, also shown in FIG. 3. Referring to FIG. 4, it follows that the diode pair, 70 and 72, substantially reduces the capacitance seen by the second node 74 and substantially reduces any voltage degradation of the voltage at the second node 74.

FIG. 5 shows the output stage of this invention, shown in FIG. 4, connected to the NMOS switch 22. As shown in FIG. 5 the NMOS switch 22 is connected between the second node 74 of the output stage of this invention and the final output node 24. The output stage of this invention allows a stable high voltage to be supplied to the gate of the NMOS switch 22. As previous schematic diagrams all voltages are referenced to ground potential and a ground node 18 is shown to indicate this.

FIG. 6 shows the complete charge pumping circuit including the output stage of this invention and the NMOS switch 22. As shown in FIG. 6, the input node 60 of the output stage of this invention is connected to the output node 20(M) of the final stage of the charge pumping circuit. FIG. 7 shows the first clock signal 71 and the second clock signal 73 showing that the voltage of the second clock signal 73 is low when the voltage of the first clock 71 signal is high, and the voltage of the first clock signal 71 is low when the voltage of the second clock signal 73 is high.

Figure 8A:
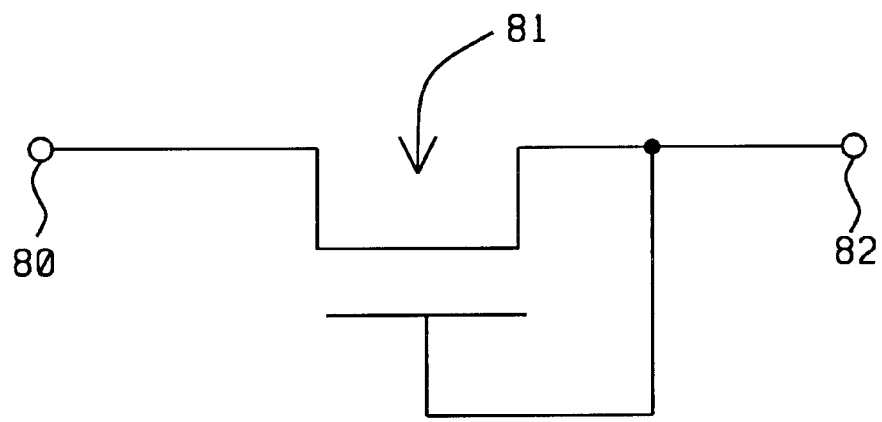
FIG. 8A shows an NMOS transistor connected in diode mode.
Figure 8B:
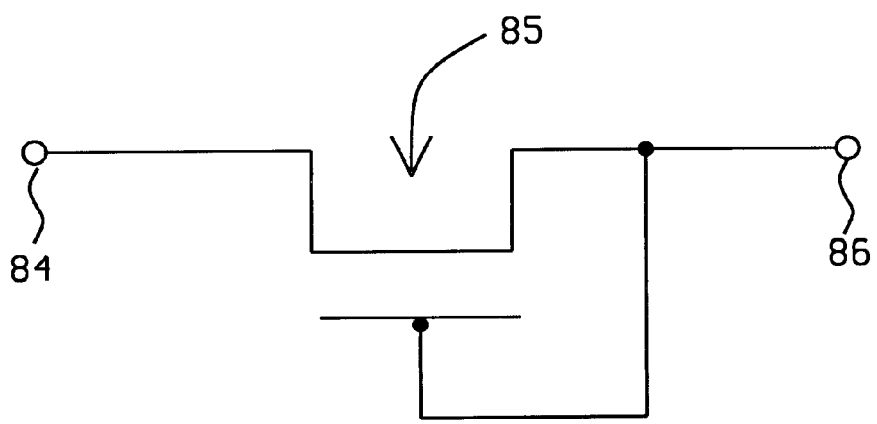
FIG. 8B shows a PMOS transistor connected in diode mode.

As those skilled in the art will recognize, the first diode 70 and second diode 72 can be replaced by metal oxide semiconductor field effect transistors connected in diode mode. FIG. 8A shows an N channel metal oxide semiconductor field effect transistor 81, NMOS, with the gate connected to the drain to provide the diode mode connection. In this configuration for the NMOS 81 in diode mode the source, node 80, is the cathode and the gate drain combination, node 82, is the anode. FIG. 8B shows a P channel metal oxide semiconductor field effect transistor 85, PMOS, with the gate connected to the drain to provide the diode mode connection. In this configuration for the PMOS 85 in diode mode the source, node 84, is the anode and the gate drain combination, node 86, is the cathode.

While the invention has been particularly shown and described with reference to the preferred embodiments thereof, it will be understood by those skilled in the art that various changes in form and details may be made without departing from the spirit and scope of the invention.

What is claimed is:

1. A charge pump output stage, comprising:
   an input node, a second node, a first clock node, and a second clock node;
   a first transistor, wherein said first transistor is an N channel metal oxide semiconductor field effect transistor having a source connected to said input node, a gate, and a drain connected to said second node;
   a second transistor, wherein said second transistor is an N channel metal oxide semiconductor field effect transistor having a source connected to said input node, a gate connected to said drain of said first transistor, and a drain connected to said gate of said first transistor;
   a first diode having an anode and a cathode wherein said cathode of said first diode is connected to said drain of said first transistor;
   a second diode having an anode and a cathode wherein said anode of said second diode is connected to said drain of said first transistor and said cathode of said second diode is connected to said anode of said first diode;
   a first capacitor connected between said first clock node and said anode of said first diode; and
   a second capacitor connected between said second clock node and said drain of said second transistor.

2. The charge pump output stage of claim 1, wherein said second node is connected to an N channel metal oxide semiconductor field effect transistor switch.

3. The charge pump output stage of claim 1, wherein said input node is connected to a multistage charge pump circuit.

4. The charge pump output stage of claim 1, wherein said input node is connected to a four phase charge pump circuit.

5. The charge pump output stage of claim 1, wherein said input node is connected to a four stage charge pump circuit.

6. The charge pump output stage of claim 1, wherein said first capacitor has a capacitance of between about 0.6 and 0.8 picofarads.

7. The charge pump output stage of claim 1, wherein said second capacitor has a capacitance of between about 0.06 and 0.08 picofarads.

8. The charge pump output stage of claim 1, wherein the voltage at the second clock node is low when the voltage at the first clock node is high.

9. The charge pump output stage of claim 1, wherein the voltage at the first clock node is low when the voltage at the second clock node is high.

10. The charge pump output stage of claim 1 wherein said first diode is replaced by a third transistor, said third transistor is a metal oxide semiconductor field effect transistor connected in diode mode, said second diode is replaced by a fourth transistor, and said fourth transistor is a metal oxide semiconductor field effect transistor connected in diode mode.

11. The charge pump output stage of claim 1, further comprising:
    an output node;
    a ground node; and
    a third transistor wherein said third transistor is an N channel metal oxide semiconductor field effect transistor having a source connected to said second node, a gate connected to said second node, and a source connected to said output node.

12. A voltage multiplier circuit, comprising:
    a multistage charge pump circuit having a first output node;
    a first node connected to said first output node;
    a second node, a first clock node, and a second clock node;
    a first transistor, wherein said first transistor is an N channel metal oxide semiconductor field effect transistor having a source connected to said first node, a gate, and a drain connected to said second node;
    a second transistor, wherein said second transistor is an N channel metal oxide semiconductor field effect transistor having a source connected to said first node, a gate connected to said drain of said first transistor, and a drain connected to said gate of said first transistor;
    a first diode having an anode and a cathode wherein said cathode of said first diode is connected to said drain of said first transistor;
    a second diode having an anode and a cathode wherein said anode of said second diode is connected to said drain of said first transistor and said cathode of said second diode is connected to said anode of said first diode;
    a first capacitor connected between said first clock node and said anode of said first diode; and
    a second capacitor connected between said second clock node and said drain of said second transistor.

13. The voltage multiplier circuit of claim 12 further comprising an N channel metal oxide semiconductor field effect transistor switch connected to said second node.

14. The voltage multiplier circuit of claim 13, wherein said N channel metal oxide semiconductor field effect transistor switch comprises:
    a second output node;
    a ground node; and
    a third transistor wherein said third transistor is an N channel metal oxide semiconductor field effect transistor having a source connected to said second node, a gate connected to said second node, and a drain connected to said second output node.

15. The voltage multiplier circuit of claim 12, wherein said multistage charge pump circuit is a four phase charge pump circuit.

16. The voltage multiplier circuit of claim 12, wherein said multistage charge pump circuit is a two phase charge pump circuit.

17. The voltage multiplier circuit of claim 12, wherein said first capacitor has a capacitance of between about 0.6 and 0.8 picofarads.

18. The voltage multiplier circuit of claim 12, wherein said second capacitor has a capacitance of between about 0.06 and 0.08 picofarads.

19. The voltage multiplier circuit of claim 12, wherein the voltage at the second clock node is low when the voltage at the first clock node is high.

20. The voltage multiplier circuit of claim 12, wherein the voltage at the first clock node is low when the voltage at the second clock node is high.

21. The voltage multiplier circuit of claim 12 wherein said first diode is replaced by a third transistor, said third transistor is a metal oxide semiconductor field effect transistor connected in diode mode, said second diode is replaced by a fourth transistor, and said fourth transistor is a metal oxide semiconductor field effect transistor connected in diode mode.

22. A method of providing a stable output voltage for a voltage multiplier circuit, comprising:

providing a multistage charge pump circuit having a first output node;

providing a first node connected to said first output node;

providing a second node, a first clock node, and a second clock node;

providing a first transistor, wherein said first transistor is an N channel metal oxide semiconductor field effect transistor having a source connected to said first node, a gate, and a drain connected to said second node;

providing a second transistor, wherein said second transistor is an N channel metal oxide semiconductor field effect transistor having a source connected to said first node, a gate connected to said drain of said first transistor, and a drain connected to said gate of said first transistor;

providing a first diode having an anode and a cathode;

providing a second diode having an anode and a cathode;

connecting said cathode of said first diode to said drain of said first transistor;

connecting said anode of said second diode to said drain of said first transistor and said cathode of said second diode to said anode of said first diode;

connecting a first capacitor between said first clock node and said anode of said first diode; and connecting a second capacitor between said second clock node and said drain of said second transistor.

23. The method of claim 22 further comprising connecting an N channel metal oxide semiconductor field effect transistor switch to said second node.

24. The method of claim 23 wherein said N channel metal oxide semiconductor field effect transistor switch comprises:

providing a second output node;

providing a ground node; and providing a third transistor wherein said third transistor is an N channel metal oxide semiconductor field effect transistor having a source, a gate, and a drain;

connecting said source of said third transistor to said second node;

connecting said gate of said third transistor to said second node; and connecting said drain of said third transistor to said second output node.

25. The method of claim 22 wherein said multistage charge pump circuit is a four phase charge pump circuit.

26. The method of claim 22 wherein said multistage charge pump circuit is a two phase charge pump circuit.

27. The method of claim 22 wherein said first capacitor has a capacitance of between about 0.6 and 0.8 picofarads.

28. The method of claim 22 wherein said second capacitor has a capacitance of between about 0.06 and 0.08 picofarads.

29. The method of claim 22 wherein the voltage at the second clock node is low when the voltage at the first clock node is high.

30. The method of claim 22 wherein the voltage at the first clock node is low when the voltage at the second clock node is high.

31. The method of claim 22 wherein said first diode is replaced by a third transistor, said third transistor is a metal oxide semiconductor field effect transistor connected in diode mode, said second diode is replaced by a fourth transistor, and said fourth transistor is a metal oxide semiconductor field effect transistor connected in diode mode.

* * * * *